United States Patent [19]

Tanaka

[11] Patent Number: 5,113,061
[45] Date of Patent: May 12, 1992

[54] OPTICAL CARD HAVING AN IDENTIFIER FOR IDENTIFYING TRACK CONSTRUCTION AND APPARATUS FOR WRITING AND/OR READING DATA ON AND/OR FROM THE OPTICAL CARD

[75] Inventor: Hisakatsu Tanaka, Chofu, Japan

[73] Assignee: Olympus Optical Co., Ltd., Japan

[21] Appl. No.: 152,324

[22] Filed: Feb. 4, 1988

[30] Foreign Application Priority Data

Feb. 13, 1987 [JP] Japan .................. 62-31086
Feb. 13, 1987 [JP] Japan .................. 62-31087

[51] Int. Cl.⁵ .......... G06K 7/10; G11B 7/013
[52] U.S. Cl. .................. 235/454; 235/494; 369/275.3; 369/58; 369/47
[58] Field of Search .......... 235/454, 487, 488, 494; 369/54, 58, 59, 47, 48, 275, 14, 275.3

[56] References Cited

U.S. PATENT DOCUMENTS

| | | |
|---|---|---|
| 3,918,029 | 11/1975 | Lemelson . |
| 4,534,031 | 8/1985 | Jewer .................. 369/59 |
| 4,656,346 | 4/1987 | Drexler .................. 235/487 |
| 4,660,103 | 4/1987 | Wilkinson et al. .................. 360/18 |
| 4,688,203 | 4/1987 | Koishi et al. .................. 369/48 |
| 4,707,818 | 11/1987 | Suzuki et al. .................. 369/59 |
| 4,775,969 | 10/1988 | Osterlund .................. 369/59 |
| 4,791,622 | 12/1988 | Clay et al. .................. 369/48 |
| 4,800,550 | 1/1989 | Yamauchi .................. 369/47 |
| 4,811,124 | 3/1989 | Dujari et al. .................. 369/59 |
| 4,862,295 | 8/1989 | Tanaka et al. .................. 369/59 |
| 4,910,725 | 3/1990 | Drexler et al. .................. 235/494 |

FOREIGN PATENT DOCUMENTS

| | | |
|---|---|---|
| 207762 | 1/1987 | European Pat. Off. .................. 369/47 |
| 2312087 | 5/1976 | France . |
| 2581470 | 5/1986 | France . |
| 57-27410 | 2/1982 | Japan .................. 369/48 |
| 58-500462 | 3/1983 | Japan . |
| 61-51287 | 3/1986 | Japan . |
| 61-150391 | 7/1986 | Japan . |
| 61-239385 | 10/1986 | Japan .................. 235/487 |
| 61-278055 | 12/1986 | Japan . |
| WO82/02968 | 2/1982 | PCT Int'l Appl. . |
| 2156978 | 4/1985 | United Kingdom . |
| 2167595 | 6/1985 | United Kingdom . |

*Primary Examiner*—Robert Weinhardt
*Attorney, Agent, or Firm*—Parkhurst, Wendel & Rossi

[57] ABSTRACT

An optical card for storing a large amount of data in an optically readable manner, including a plurality of tracks formed in a data record layer in parallel with each other, each track being divided into a data record area and an address record area, and identifiers each recorded in address record areas of respective tracks. By optionally reading the identifier from the optical card, it is possible to recognize automatically the track construction denoting the number of sectors per track and the number of bytes per sector.

6 Claims, 5 Drawing Sheets

FIG_1A
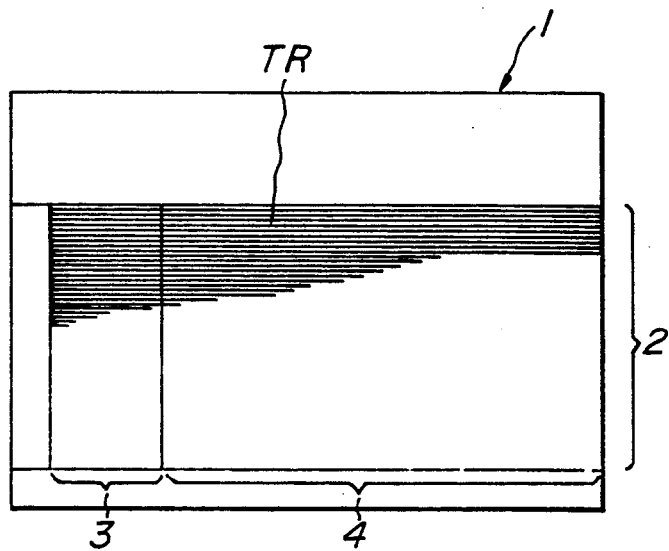
FIG_1B
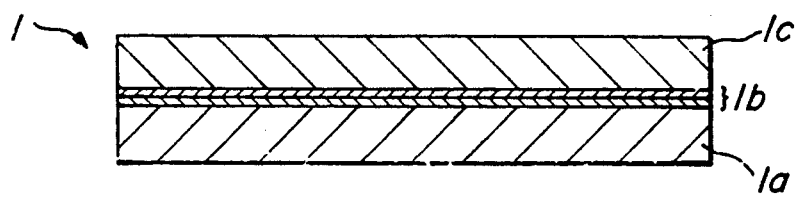
FIG_2
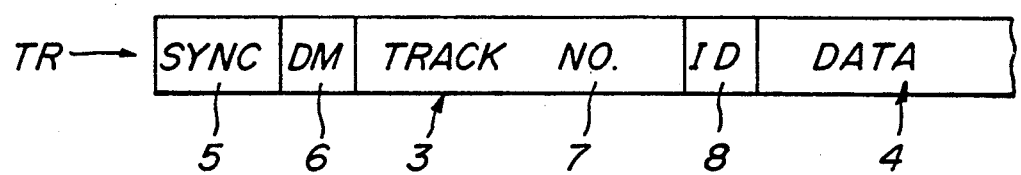

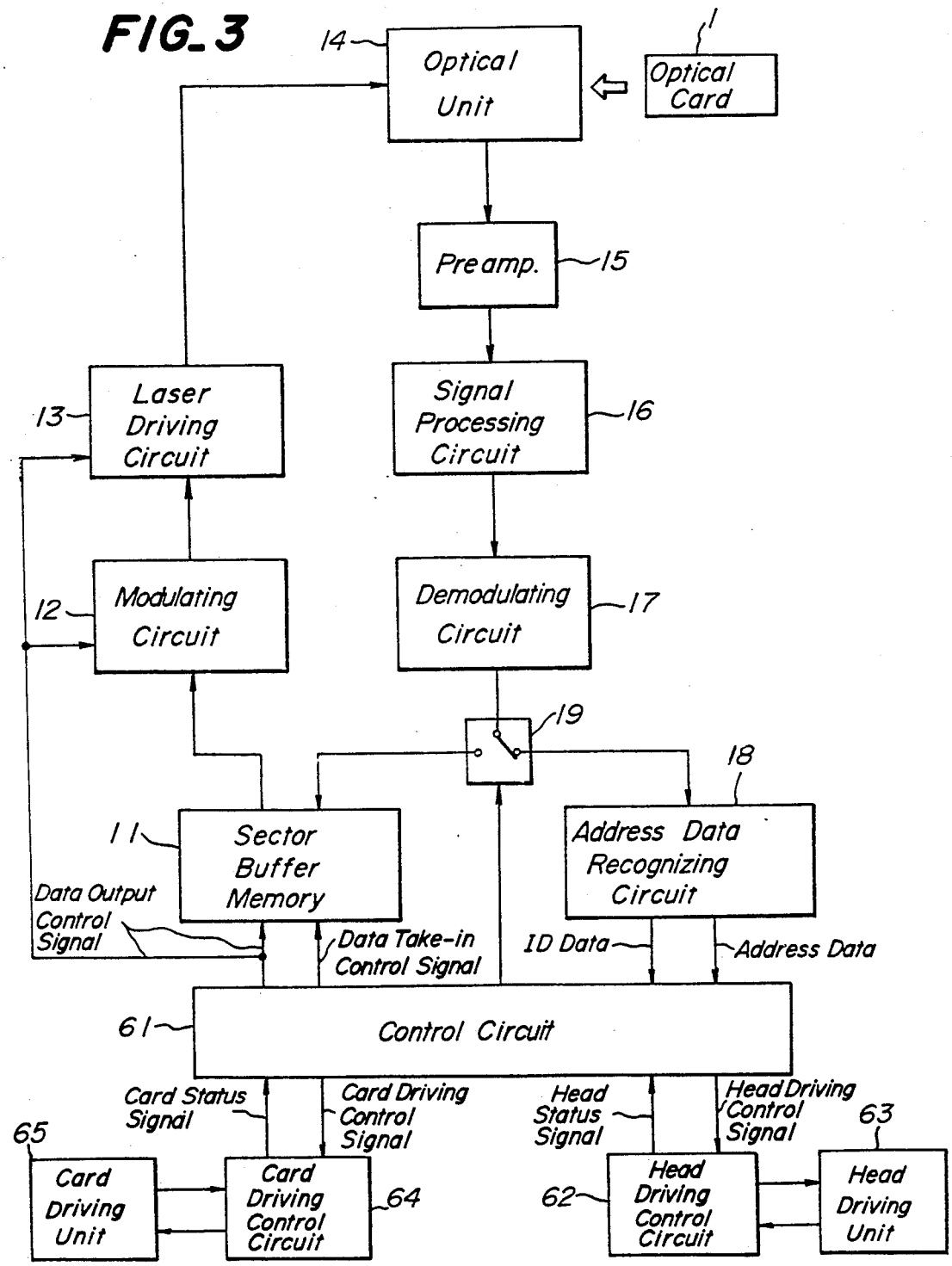

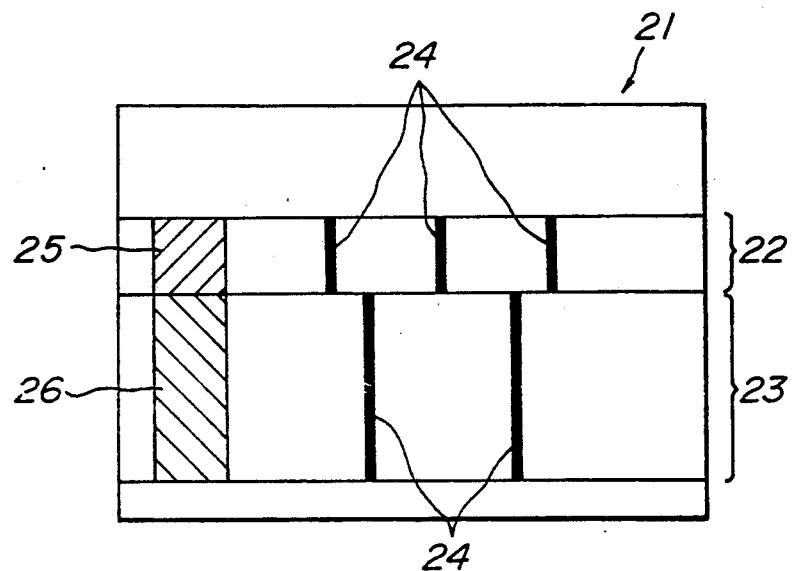
FIG_4
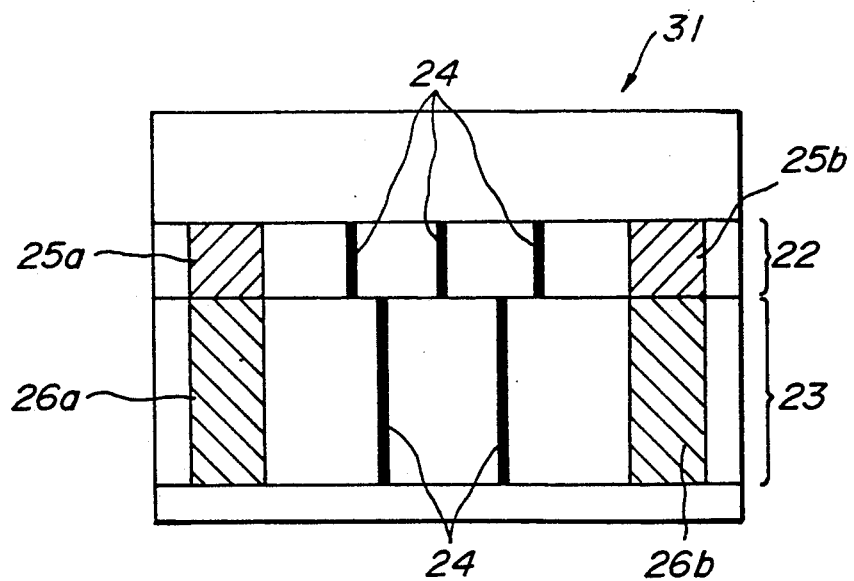
FIG_5

FIG_6
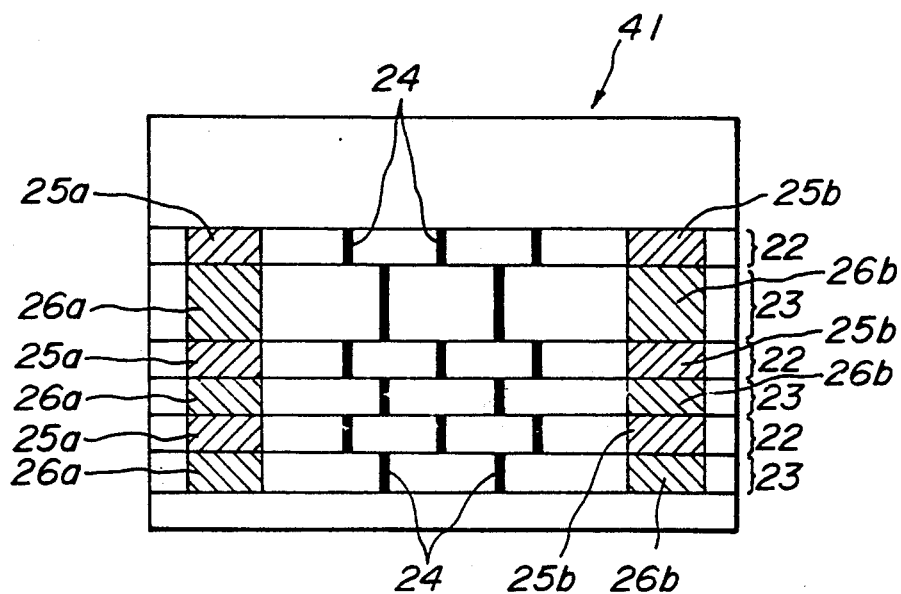
FIG_7
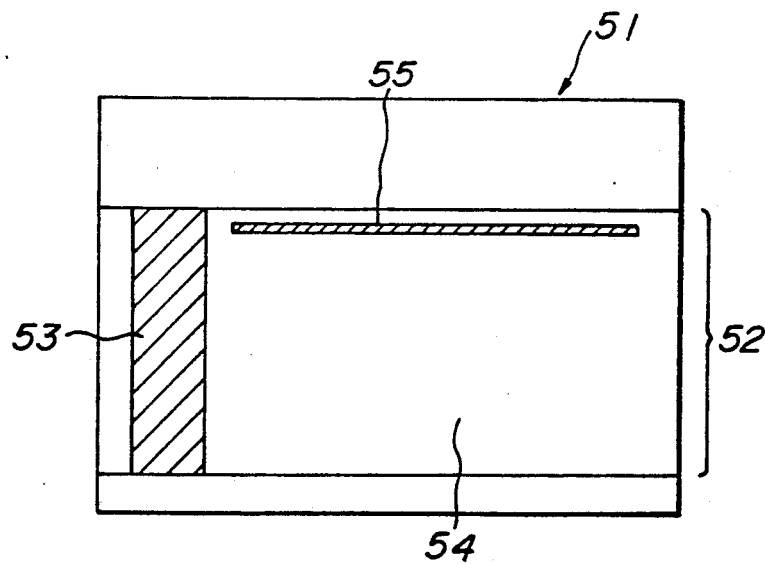

OPTICAL CARD HAVING AN IDENTIFIER FOR IDENTIFYING TRACK CONSTRUCTION AND APPARATUS FOR WRITING AND/OR READING DATA ON AND/OR FROM THE OPTICAL CARD

BACKGROUND OF THE INVENTION

Field of the Invention and Related Art Statement

This invention relates to an optical card and an apparatus for writing and/or reading data onto and/or from an optical card.

An optical card has been disclosed in PCT Publication WO 82/020968, and Japanese Publication Kokai Nos. 61-51,287 and 61-150,391.

In general, the optical card comprises a substrate in the form of a rectangular sheet made of synthetic resin, a data record layer applied on the substrate and a protection layer applied on the data record layer and made of transparent synthetic resin. The reading and/or writing of data for such an optical card is effected by projecting a laser beam onto the data record layer via the transparent protection layer. There have been proposed various kinds of optical cards having different constructions. In almost all optical cards, the data record layer includes a number of tracks extending in parallel with each other usually in the longitudinal direction of the card. Each track is composed of a data record area, and an address data area in which address data for identifying the relevant track is recorded.

In general, the track construction of the optical cards are different from each other in accordance with applications thereof. For instance, the number of bytes in a sector is different for optical cards of different applications. In an application in which a large amount of data has to be read out and/or written in each operation, the number of bytes in a sector must be large, such as 1024 bytes or 2048 bytes. On the contrary, in an application in which a small amount of data is handled in each operation step, the number of bytes per sector is set to a small value such as 32 bytes or 16 bytes. In this manner, the numbers of bytes in a sector of optical cards for various applications differ from each other. This results in that the numbers of sectors in a track are also different for various kinds of optical cards. The optical cards having different track constructions could not be treated by the same reading and/or writing apparatus. That is to say, each apparatus is designed and manufactured to be exclusively used for optical cards having predetermined track constructions. This causes a demerit upon makers for manufacturing writing and/or reading apparatuses. In order to use the reading and/or writing apparatus for various kinds of optical cards, there have been proposed various methods. In one method, the writing and/or reading apparatus is readjusted by a user in accordance with particular track constructions of optical cards to be used. In another method, the writing and/or reading apparatus comprises a plurality of circuit sections each being constructed to meet with respective track constructions and a switching circuit for selecting one of said circuit sections in accordance with the track construction of optical cards to be used. The switching circuit may be manually operated by a user or is automatically operated with the aid of commands transmitted from a host computer. However, in these known methods, the user must recognize the track construction of respective optical cards which the users want to use. This requires the cumbersome and time consuming operation of the user. Moreover, in the known optical card system, it is impossible to utilize a writing and/or reading apparatus for plural kinds of optical cards having different track constructions. In other words, once the writing and/or reading apparatus has been adjusted to use a predetermined kind of optical card, the apparatus could no more treat any optical cards having different track constructions. This would restrict the versatility of the optical cards.

Further, in a known optical card, all the tracks in the card have the same track construction. Usually, each of tracks in a card constitutes a single sector which includes 1024 bytes. This is due to the fact that the track construction has to be determined in such a manner that the longest data can be recorded in one sector. It thus is apparent that the data record area of the optical card could not be utilized efficiently in case of writing data having a shorter length.

SUMMARY OF THE INVENTION

The object of the present invention is to provide a novel and useful optical card by means of which writing and/or reading of the data for optical cards having different track constructions can be effected positively and easily, although the track constructions of optical cards are not recognized.

It is another object of the invention to provide an optical card on which data can be written in a highly efficient manner without wasting a data record area.

It is still another object of the invention to provide a novel and useful apparatus for writing and/or reading data on and/or from an optical card, in which the writing and/or reading of the data can be performed easily and positively although the track constructions of the optical cards are not recognized by the user.

According to the invention, an optical card for storing data in an optically readable manner comprises a substrate in the form of a sheet, a data record layer applied on one surface of the substrate, and a protection layer applied on the data record layer. The data record layer includes a plurality of tracks arranged in parallel with each other and each of the tracks is divided into a data record area in which data has been recorded or will be recorded and an address record area in which address data of relevant tracks have been recorded. The improvements attributed to the present invention are characterized in that the optical card further comprises at least one identifier for identifying the construction of tracks. The identifier is recorded on the optical card in an automatically readable manner.

In a preferred embodiment of the optical card according to the invention, the identifier for denoting the track construction is recorded in an optically readable manner. In such an optical card, the identifier may be recorded in the address record area or in the data record area. In the former case, the data format of the address record area has to be identical for all optical cards having different track constructions. In the latter case, the track in which the identifier has been recorded should have the same track construction for all optical cards having different track constructions.

According to the invention, an apparatus for writing and/or reading data on and/or from an optical card having at least one identifier for denoting the track construction, comprises:

an optical unit means for writing and/or reading data on and/or from the optical card; and a reproducing means for automatically reproducing the identifier out of the optical card and recognizing the track construction.

In a preferred embodiment of the apparatus according to the invention for use in an optical card in which the identifier is recorded as pits which are recorded in an optically readable manner, the identifier is read out optically with the aid of the optical unit means for writing and/or reading the data and then the read out identifier is processed to produce an identifier signal in the same manner as the read out data, then the identifier signal is selectively supplied to an address data recognizing circuit to recognize the track construction.

BRIEF DESCRIPTION OF THE DRAWINGS

FIGS. 1A and 1B are plan and cross sectional views, respectively showing an embodiment of the optical card according to the invention;

FIG. 2 is a schematic view showing the construction of the address record area of the optical card shown in FIG. 1;

FIG. 3 is a block diagram illustrating an embodiment of the optical card writing and reading apparatus according to the invention;

FIG. 4 is a plan view showing schematically another embodiment of the optical card according to the invention;

FIG. 5 is a schematic plan view depicting still another embodiment of the optical card according to the invention;

FIG. 6 is a schematic plan view illustrating still another embodiment of the optical card according to the invention;

FIG. 7 is a plan view showing schematically still another embodiment of the optical card according to the invention;

DESCRIPTION OF THE PREFERRED EMBODIMENTS

Figure 8:
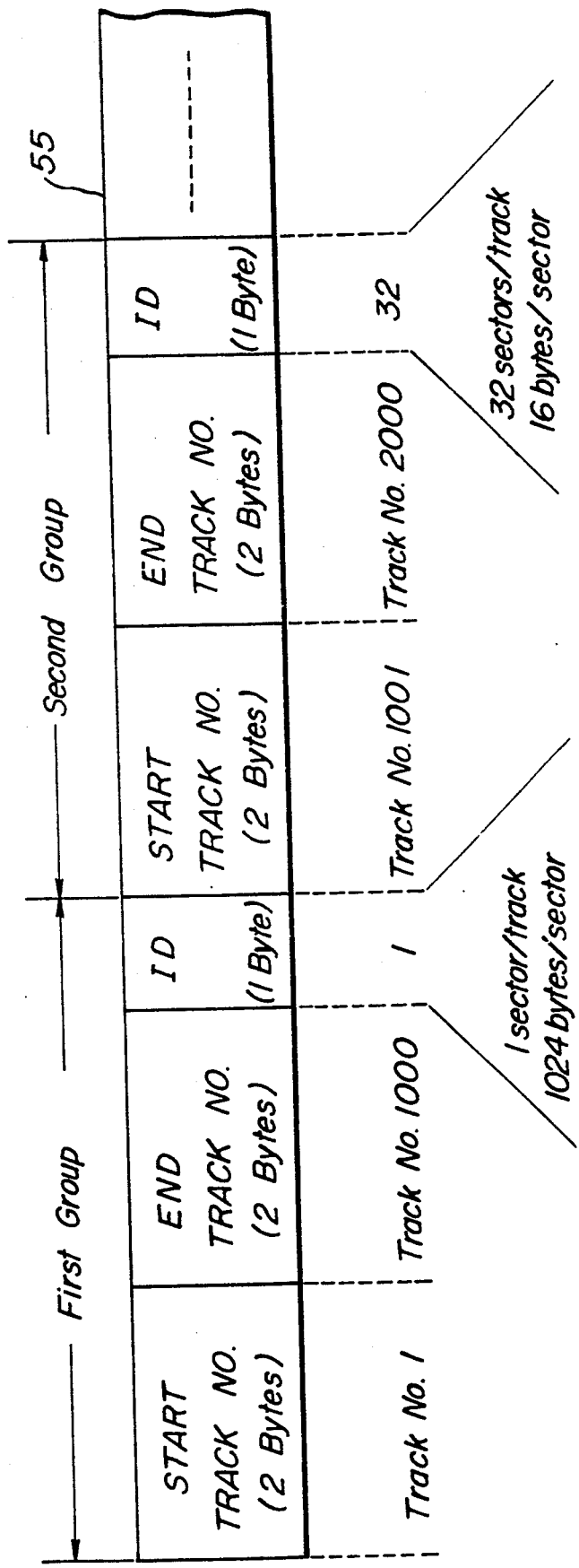
FIG. 8 is a schematic view showing the data format of the identifier shown in FIG. 7.

FIGS. 1A and 1B are plan and cross sectional views showing an embodiment of the optical card according to the invention. This optical card 1 is a write-once type and comprises a substrate 1a in the form of a rectangular sheet, a data record layer 1b applied on one surface of the substrate, and a protection layer 1c applied on the data record layer. The substrate 1a is usually formed by synthetic resin such as acrylic resin. The data record layer 1b is generally composed of a plurality of thin films made of metals or metal oxides. The protection layer 1c is to protect the record layer 1b and is usually made of transparent synthetic resin, because the writing and reading are carried out by projecting a laser light beam onto the record layer 1b through the protection layer 1c.

As clearly shown in FIG. 1A, the optical card 1 comprises an optical record section 2 in which a number of tracks TR have been formed in parallel with each other in the longitudinal direction of the rectangular optical card. Each track TR comprises an address record area 3 in which address data of the relevant track has been recorded, and a data record area 4 in which the data has been or will be recorded. In the present embodiment, in the address record area 3 of each track TR there has been recorded an identifier for denoting the construction of the relevant track in such a manner that the identifier can be automatically read out by means of an optical writing and reading head.

FIG. 2 is a schematic view showing the data format of the address record area 3 of the track TR. The address record area 3 has a pull-in section 5 for recording a synchronizing pattern (SYNC) for pulling the clock pulse generation into synchronism with the optical scanning, a data mark section 6 for recording a data mark (DM) indicating a top of the data, a track number section 7 for recording a track number (TRACK NO.) and a special section 8 for recording an identifier (ID). The identifier ID has been recorded on the optical card together with the SYNC, DM and TRACK NO. In the present embodiment, the same identifier ID has been recorded in all the tracks TR, because all the tracks have the same track construction. The identifier ID may take various forms. For instance, the identifier ID may be formed as a pit pattern composed of a plurality of bits such as 8 bits or 16 bits. Usually the identifier ID may be formed by one or a few bytes for denoting track construction such as the number of sectors in a track and the number of bytes in a sector. For instance, when the identifier ID is composed of one byte, 256 different codes may be classified. Prior to the writing or reading, the identifier ID is read out to recognize automatically the track construction of the optical card.

FIG. 3 is a block diagram illustrating an embodiment of the writing and reading apparatus according to the invention. In the present embodiment, use is made of the optical card 1 shown in FIG. 1. In order to write the data in a data record area 4 of a track on the optical card 1, the data read out of a sector buffer memory 11 is modulated in a modulating circuit 12 and a modulated data signal is supplied to a laser driving circuit 13. Then the laser driving circuit 13 produces a laser driving signal which is supplied to a semiconductor laser provided in an optical unit 14. The construction of the optical unit 14 in the optical card writing and reading apparatus has been well known in the art, so that the detailed explanation thereof may be dispensed with. The driving current for the semiconductor laser in the optical unit 14 is modulated such that the laser beam emitted by the semiconductor laser in the optical unit exceeds the sensitizable level of the record layer 1b of the optical card 1.

When reading the data written in the data record area 4 of the optical card 1, the output signal supplied from the optical unit 14 is amplified by a preamplifier 15 and then is converted into a bivalent signal by a signal processing circuit 16. The bivalent signal is then supplied to a demodulating circuit 17 to recover the data signal which is then stored in the sector buffer memory 11.

Before effecting the writing and reading, the data recorded in the address record area 3 is read out. The reading operation for the address record area 3 is identical with that for the data record area 4, but in the reproduction for the address record area, the demodulated data from the demodulating circuit 17 is supplied to an address data recognizing circuit 18 via a selector 19 to recognize the track number TRACK NO. and the identifier ID. In this manner, it is possible to recognize automatically the track construction from the thus read out identifier ID. During writing and reading, the apparatus is automatically controlled in accordance with the track construction. Therefore, it is no longer necessary to readjust manually the apparatus or to control the apparatus by the command from the host computer.

As shown in FIG. 3, the address data and the identifier data denoting the track construction or track format generated by the address data recognizing circuit 18 are supplied to a control circuit 61. In the control circuit 61, the read out address is compared with an address of a track for which the writing or reading is to be effected. When these addresses are not coincident with each other, the control circuit 61 supplies a head driving control signal to a head driving control circuit 62 which then supplies a driving signal to a head driving unit 63 for moving the head. At the same time, the control circuit 61 supplies a card driving control signal to a card driving control circuit 64 which supplies a driving signal to a card driving unit 65. The head driving unit 63 includes a sensor for detecting the movement of the head to generate a detection signal. The detection signal is supplied to the head driving control circuit 62 to effect the speed control and position control of the head. The card driving unit 65 also includes a sensor for detecting the movement of the card to generate a detection signal which is supplied to the card driving control circuit 64 to effect the speed control of the card. The head driving control circuit 62 and card driving control circuit 64 supply various kinds of status signals to the control circuit 61. The status signals may include limit position signal, home position signal and end of movement signal. When the read out track address is identical with the desired track address, the movement of the head and card is stopped. When data is read out of the optical card 1, the control circuit 61 supplies a data take-in control signal to the sector buffer memory 11 at predetermined timings in accordance with the track construction. It should be noted that the selector 19 is also controlled by the control circuit 61. In the writing mode, the control circuit 61 supplies a data output control signal to the sector buffer memory 1, modulating circuit 12 and laser driving circuit 13 to control these circuits at timings predetermined in accordance with the detected track construction.

FIG. 4 is a schematic plan view showing another embodiment of the optical card according to the invention. An optical card 21 comprises two data record sections 22 and 23 having different track constructions. In the first data record section 22, each of tracks comprises four sectors divided by three sector marks 24, and in the second data record section 23 each of the tracks includes three sectors divided by two sector marks 24. The tracks in the first data record section 22 further comprise address record areas 25 in which track numbers and identifiers for respective tracks have been previously recorded. In address record areas 26 of the tracks belonging to the second data record section 23 there have been also recorded the track numbers and identifiers. By reading the identifiers stored in the address record areas 25 and 26 of respective tracks, it is possible to recognize the track constructions, so that the writing and reading of the data for the data record sections 22 and 23 can be automatically adapted to the track construction. According to the invention, a single optical card can comprise tracks having different track constructions and therefore the data can be recorded effectively on the optical card without wasting the data record areas.

FIG. 5 is a schematic plan view depicting another embodiment of the optical card according to the invention. In the present embodiment, an optical card 31 comprises first and second data record sections 22 and 23 like the embodiment shown in FIG. 4. Each track in the first and second data record sections 22 and 23 includes two address record areas 25a, 25b and 26a, 26b, respectively provided at respective ends of the tracks. In effecting the writing and reading in the left to right direction, the track construction can be recognized by reading the identifiers recorded in the left hand side address record areas 25a and 26a, and when performing the writing and reading in the right to left direction, the track constructions can be read out of the right hand side address record areas 25b and 26b.

FIG. 6 shows another embodiment of the optical card according to the invention. In the present embodiment, a plurality of first data record sections 22 having tracks each including four sectors divided by three sector marks 24 and a plurality of second data record sections 23 having tracks each of which comprises three sectors are provided in a mixed manner.

FIG. 7 is a schematic view illustrating still another embodiment of the optical card according to the invention. In all the previous embodiments, the identifiers for denoting the track construction are recorded in the address record areas in all the tracks. In the present embodiment, an identifier 55 has been recorded in a data record area 54 of a predetermined track, for instance, the first track. The identifier 55 is recorded in an optically readable manner in the same format as the usual data. It should be noted that the construction of the track in which the identifier 55 has been recorded should have the same track construction for all optical cards. In case of manufacturing respective optical cards, there is recorded the identifier 55 for denoting the track construction. The identifier 55 may contain such information as "for tracks No. 1 to No. 1000, one sector per track and 1024 bytes per sector, and for tracks 1001 to 2000, 32 sectors per track and 16 bytes per sector". FIG. 8 is a schematic view illustrating the construction of the identifier 55. By reproducing the identifier 55 recorded in the predetermined track on the optical card prior to the writing and reading, it is possible to recognize the track construction.

The present invention is not limited to the embodiments explained above, but many modifications and alternations may be considered within the scope of the invention by those skilled in the art.

In the above embodiments, the optical cards are of the write-once type, but the present invention may be equally applied to ROM cards in which only the reproduction can be effected. Moreover, in the embodiments shown in FIGS. 4 to 7, there are provided two kinds of the track constructions, but more than two track constructions may be provided. In the embodiment illustrated in FIG. 7, the identifier has been recorded in the predetermined track during the manufacturing process of the optical cards, but it is also possible to record an identifier after manufacturing the optical cards. In such a case, desired track constructions may be utilized in accordance with respective applications. Further, the identifiers for denoting the track construction may be recorded on a magnetic record section which is provided separately from the optical record section.

What is claimed is:

1. An optical card for storing data in an optically readable manner, comprising:
    a substrate in the form of a sheet;
    a data record layer on one surface of the substrate, said record layer including a plurality of rectilinear tracks arranged parallel with each other and having the same length, each of said plurality of tracks being divided into a data record area for recording data therein and an address record area in which at least address data of one or more selected tracks has been recorded, said plurality of tracks comprising a plurality of data tracks and a single management track, said plurality of data tracks being arranged in data track groups of different construction, each of said plurality of data tracks belonging to a single data track group having the same construction, said construction being defined by a number of sectors in each of said plurality of data tracks, said number of sectors in each of said plurality of data tracks being a value selected from at least two different whole numbers; and a plurality of identifiers for identifying the construction of said plurality of data tracks, said plurality of identifiers being recorded seriatim in said management track, wherein said management track is automatically readable by scanning said management track in its length direction, said identifiers including track numbers of a first and last data track in each of said data track groups and a number corresponding to the number of sectors in each of said plurality of data tracks in each of said data track groups.

2. The optical card of claim 1, wherein said identifiers comprise a plurality of pits which have been recorded in said record layer in an optically readable manner.

3. The optical card of claim 1, wherein each of said identifiers has a different content for identifying different kinds of track construction.

4. The optical card of claim 1, wherein each of said identifiers has the same content for identifying the same kind of track construction.

5. A system for writing and reading data comprising:
an optical card;
optical unit means for writing and reading data on said optical card; and
receiving means for automatically receiving identifiers from said optical unit means and recognizing track construction, wherein said optical card comprises:
a) a substrate in the form of a sheet;
b) a data record layer on one surface of the substrate, said record layer including a plurality of rectilinear tracks arranged parallel with each other and having the same length, each of said plurality of tracks being divided into a data record area for recording data therein and an address record area in which at least address data of one or more selected tracks has been recorded, said plurality of tracks comprising a plurality of data tracks and a single management track, said plurality of data tracks being arranged in data track groups of different construction, each of said plurality of data tracks belonging to a single data track group having the same construction, said construction being defined by a number of sectors in each of said plurality of data tracks, said number of sectors in each of said plurality of data tracks being a value selected from at least two different whole numbers; and
c) a plurality of said identifiers for identifying the construction of said plurality of data tracks, said plurality of identifiers being recorded seriatim in said management track, wherein said management track is automatically readable by scanning said management track in its length direction, said identifiers including track numbers of a first and last data track in each of said data track groups and a number corresponding to the number of sectors in each of said plurality of data tracks in each of said data track groups.

6. The system of claim 5, wherein said receiving means comprises:
a signal processing circuit for receiving a signal supplied for said optical unit means to produce an identifier signal; and
a recognizing circuit for receiving said identifier signal to recognize said track construction.

* * * * *